United States Patent
Hill et al.

(10) Patent No.: US 6,493,920 B1
(45) Date of Patent: Dec. 17, 2002

(54) METHOD OF ASSEMBLING A VEHICLE FROM PREASSEMBLED MODULAR COMPONENTS

(75) Inventors: David John Hill, Ann Arbor, MI (US); Kimberly Ann Lazarz, Ypsilanti, MI (US); Matthias Baumann, Aachen (DE); Matthew John Zaluzec, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/657,209

(22) Filed: Sep. 7, 2000

(51) Int. Cl.$^7$ ................................................ B23P 21/00
(52) U.S. Cl. ............................. 29/469; 29/430; 29/505; 296/197
(58) Field of Search ....................... 29/430, 469, 469.5, 29/505, 458; 296/196, 197, 210, 225

(56) References Cited

U.S. PATENT DOCUMENTS

| | | | | |
|---|---|---|---|---|
| 2,173,515 A | * | 9/1939 | Eklund | 280/794 |
| 2,173,525 A | * | 9/1939 | Wallace | 280/796 |
| 2,389,907 A | * | 11/1945 | Helmuth | 296/203.01 |
| 3,022,105 A | * | 2/1962 | Tjaarda | 296/196 |
| 3,541,668 A | * | 11/1970 | Wessells, III et al. | 29/469 |
| 4,712,287 A | * | 12/1987 | Johnston | 29/469 |
| 4,735,355 A | | 4/1988 | Browning | |
| 4,759,489 A | * | 7/1988 | Pigott | 228/102 |
| 4,883,310 A | * | 11/1989 | Miyazaki et al. | 296/210 |
| 4,900,083 A | * | 2/1990 | Kumasaka et al. | 296/197 |
| 4,914,802 A | * | 4/1990 | Takao et al. | 29/469 |
| 4,986,597 A | | 1/1991 | Clausen | |
| 4,991,282 A | * | 2/1991 | Konig | 29/407 |
| 5,090,105 A | * | 2/1992 | Derees | 29/469 |
| 5,209,541 A | * | 5/1993 | Janotik | 296/29 |
| 5,319,840 A | * | 6/1994 | Yamamoto et al. | 29/430 |
| 5,338,080 A | | 8/1994 | Janotik et al. | |
| 5,619,784 A | * | 4/1997 | Nishimoto et al. | 29/430 |
| 5,720,511 A | | 2/1998 | Benedyk | |
| 5,820,015 A | | 10/1998 | Childree | |
| 5,881,458 A | * | 3/1999 | Wolf et al. | 29/897.2 |
| 5,915,781 A | * | 6/1999 | DeRees | 296/203 |
| 6,003,898 A | * | 12/1999 | Teply et al. | 280/785 |
| 6,102,472 A | * | 8/2000 | Wallstrom | 296/203.01 |
| 6,139,094 A | * | 10/2000 | Teply et al. | 296/203.3 |
| 6,167,609 B1 | * | 1/2001 | Marinelli et al. | 29/469.5 |
| 6,205,638 B1 | * | 3/2001 | Yustick | 29/464 |
| 6,334,252 B1 | * | 1/2002 | Sato et al. | 29/897.2 |

FOREIGN PATENT DOCUMENTS

| | | | |
|---|---|---|---|
| DE | 3540814 A1 | 11/1985 | |
| EP | 1067213 A1 | 1/2001 | |
| GB | 2191977 A | 12/1987 | |
| GB | 2340133 A | 2/2000 | |
| JP | 56096083 | 3/1981 | |
| WO | WO 87/03846 | * 7/1987 | ............ B60J/1/00 |
| WO | WO 99/65759 A1 | 6/1998 | |
| WO | WO 98/45082 | 10/1998 | |

* cited by examiner

Primary Examiner—Gregory M. Vidovich
Assistant Examiner—Essama Omgba
(74) Attorney, Agent, or Firm—Damian Parcari

(57) ABSTRACT

The present invention relates to a method of assembling a vehicle. The method comprises providing an open-top cab module comprising a metallic base frame, a plurality of exterior body panels secured to the base frame, and interior cab module trim component. A roof assembly is then provided. The roof assembly comprises a light metallic roof frame, at least one roof panel supported on the roof frame, glass components comprising at least a front windshield supported on the roof frame, and interior roof assembly trim components supported on the roof frame. The roof assembly is then secured to the cab module.

23 Claims, 3 Drawing Sheets

METHOD OF ASSEMBLING A VEHICLE FROM PREASSEMBLED MODULAR COMPONENTS

TECHNICAL FIELD

The present invention relates generally to the assembling of a vehicle from preassembled modular components.

BACKGROUND ART

Vehicles have generally been built in a process that has been termed "body out". In a "body out" construction process, the frame of the vehicle is assembled first. The closure panels, or body panels, such as the hood, trunk, and doors are then mounted on the frame to form the body assembly. The body assembly is then painted. Then the vehicle is moved to final assembly where the interior and trim components of the automobile, such as the seats, instrument panel, electrical system, etc., are inserted. The final assembly process is complicated by the fact that the interior components must be inserted and placed into the vehicle through the openings provided by the doors and side windows.

It would be desirable to be able to eliminate the drawbacks associated with final assembly as a result of the accessability limitations placed upon the assemblers by the roof and other immovable components of the vehicle.

DISCLOSURE OF INVENTION

Accordingly, the present invention is a method of assembling a vehicle. The method comprises providing an open-top cab module comprising a metallic base frame, a plurality of exterior body panels secured to the base frame, and interior trim component. A roof assembly is then provided. The roof assembly comprises a light metallic roof frame, at least one roof panel supported on the roof frame, glass components comprising at least a front windshield supported on the roof frame, and interior roof trim components supported on the roof frame. The roof assembly is then secured to the cab module.

In a preferred embodiment, portions of the roof assembly frame are secured to portions of the cab module frame.

BEST MODE FOR CARRYING OUT THE INVENTION

Figure 1:
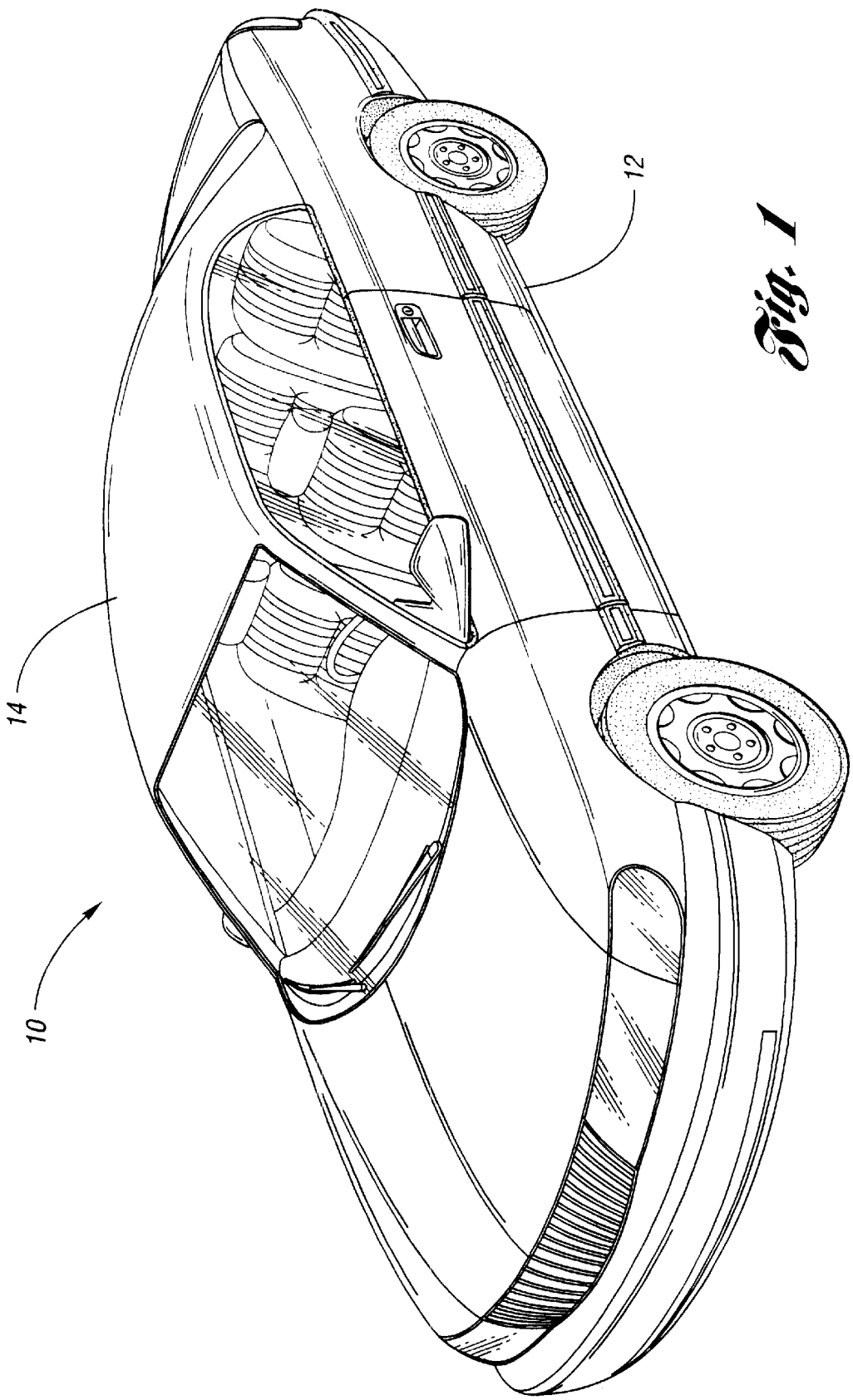
FIG. 1 is a perspective view of a vehicle manufactured in accordance with the present invention.
Figure 2:
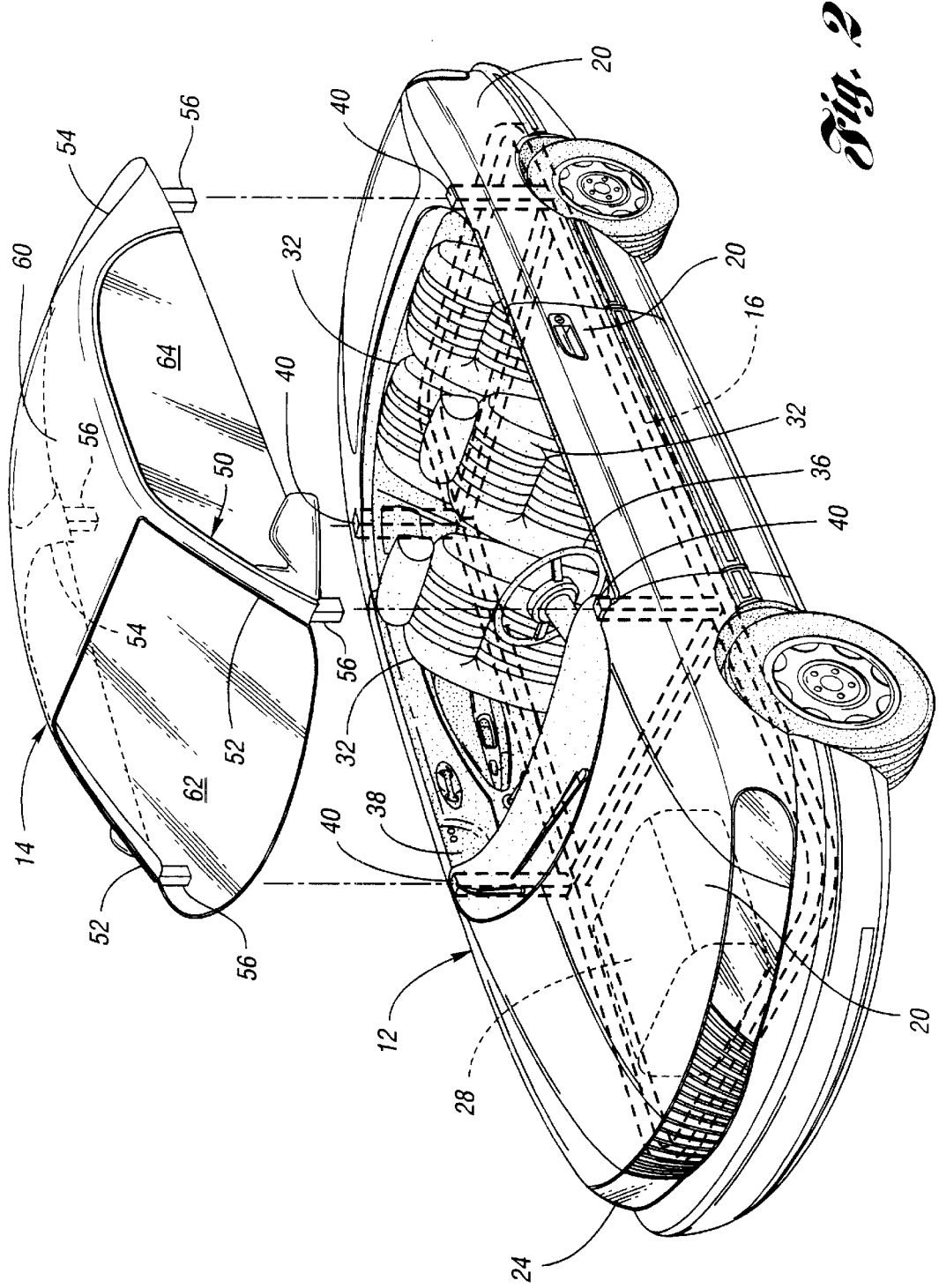
FIG. 2 is a perspective view of a vehicle being assembled in accordance with the present invention.

Referring to FIGS. 1 and 2, a vehicle 10 manufactured in accordance with the present invention is illustrated. The vehicle 10 comprises a cab module 12 and a greenhouse roof assembly 14. The cab module 12 comprises a metallic base frame 16. The base frame 16 may comprise any suitable type of vehicle base frame. For instance, the base frame 16 may comprise a steel frame, a space frame, or any other suitable types of frames for vehicles. Space frames, as is known in the art, comprise metallic, such as steel, aluminum or magnesium, members which are joined together by welding either with or without the use of joining nodes.

The cab module 12 further comprises panel members 20 such as door members, hood members, front and rear panel members, etc. The panel members 20 may be made of any suitable materials such as stamped steel, or molded plastic panels. The cab module 20 further includes the necessary lighting component such as headlights 24 and electrical wiring (not shown), and drive train components as the engine 28, transmission (not shown) and steering system (not shown). The cab module 12 further include suitable interior and trim components such as seats 32, carpeting (not shown), a steering wheel 36, interior side panels 38 (not shown), mouldings, etc. The base frame 16 comprises four upwardly extending connector members 40 for making attachment of the roof assembly 14 to the cab module 12, as will be explained in more detail below.

The roof assembly 14 comprises a roof frame 50. The roof frame 50 comprises front (A) pillars 52 and rear (C) pillars 54. Preferably, the pillars 52 and 54 each have a downwardly depending member 56, which depend from the pillars in a plane different from the plane the pillars 52 and 54 extend in. The downwardly depending member 56 are preferably hollow (i.e., sleeve members) and are securable to the connector members of the base frame 16 to secure the cab module 12 with the fame assembly 16, as will be explained in more detail below.

Materials that can be used to form the roof frame 50 include light metals such as aluminum and magnesium. The light metal components comprising the roof frame 50 can be formed in any suitable manner such as by extrusion, stamping, roll forming (if the metal is aluminum), rotary draw bending, casting (if the metal is magnesium) and semi-solid forming. The components comprising the roof frame 50 can be joined by any suitable method such as MIG welding, plasma welding, laser welding, riveting, adhesive bonding, like pressure sensitive die cut material such as 3M's one component epoxy VHB™ tape, and magnetic compression joining (or magnetic pulse welding). Though not shown in the preferred embodiment, the roof frame assembly 50 could include additional pillars such as B pillars as needed.

The roof assembly 14 further includes a roof panel 60. The roof panel 60 can be made of any suitable material such as stamped metal or plastic and suitably secured to the roof frame 50. Alternatively, the roof panel 60 could be integrally formed with the front and rear pillars 52 and 54 by any suitable means such as casting. The roof assembly 14 is preferably pre-colored prior to the securing of the roof assembly to the cab module 12. The roof frame 50 and the roof panel 60, if formed of the same light metal material as the roof frame frame 50, can be anodized to result in any of a variety of colors. If the roof panel 60 is secured to the roof frame as a separate member, the roof panel can be a suitably pre-colored, painted metallic or plastic panel, or an anodized light metal panel.

The greenhouse roof assembly 14 also comprises other necessary roof components, such as the headliner (not shown), interior lighting/wiring elements, and windshields 62 and windows 64, which are supported by the pillars 52 and 54.

The roof assembly 14 is suitably secured to the metallic base frame 16 of the cab module 12 by any suitable fastening means. The sleeve members 56 of the front and rear pillars 52 and 54 are secured to the upwardly extending connector members 40 of the base frame 16 of the cab module.

Examples of suitable fastening means include but are not limited to welding such as MIG welding, plasma welding, laser welding, riveting, adhesive bonding, and magnetic compression joining. The pillars 52 and 54 and the connector members 40 could be slotted (not shown) to facilitate a snap-fit like connection of the pillars with the connector members.

Figure 4:
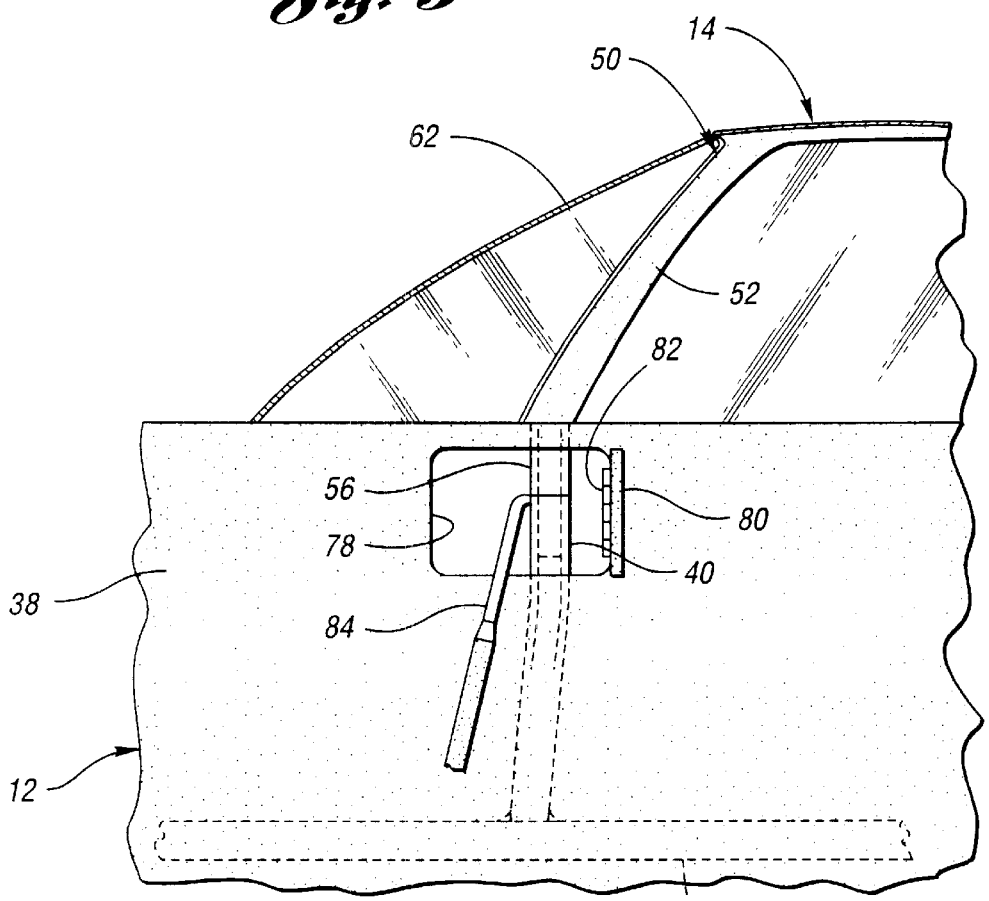
FIG. 4 is a view similar to FIG. 3 showing a preferred method of assembling the vehicle.

To employ the use of magnetic compression joining for securing the roof assembly 14 to the cab module 12, as is the case in the preferred embodiment, each of the downwardly depending sleeve members 56 of the pillars 52 and 54 as best shown in FIGS. 4, is placed over a respective one of the upwardly extending connector members 40 of the base frame 16. For illustrative purposes, only the securing of one of the sleeve members 56 to one of the connector members 40 will be shown. It should be understood that all of the pillars 52 and 54 connect to the base frame 16 in the same way.

To secure the hollow downwardly depending sleeve members 56 to the connector member 40, an electromagnetic pulse welding machine 84 is placed adjacent the hollow sleeve pillar 52 and is actuated to generate a pressure that accelerates the sleeve member up to about 200 meters per second towards the connector member 40 of the base frame 16. The pressure acceleration causes the sleeve member 56 to force the connector member 40 of the base frame 16 with sufficient impact to form a suitable weld interface between the sleeve member 56 and the connector member 40 of the base 16 to form a mechanical connection between pillar 52 and the base frame 16.

Figure 3:
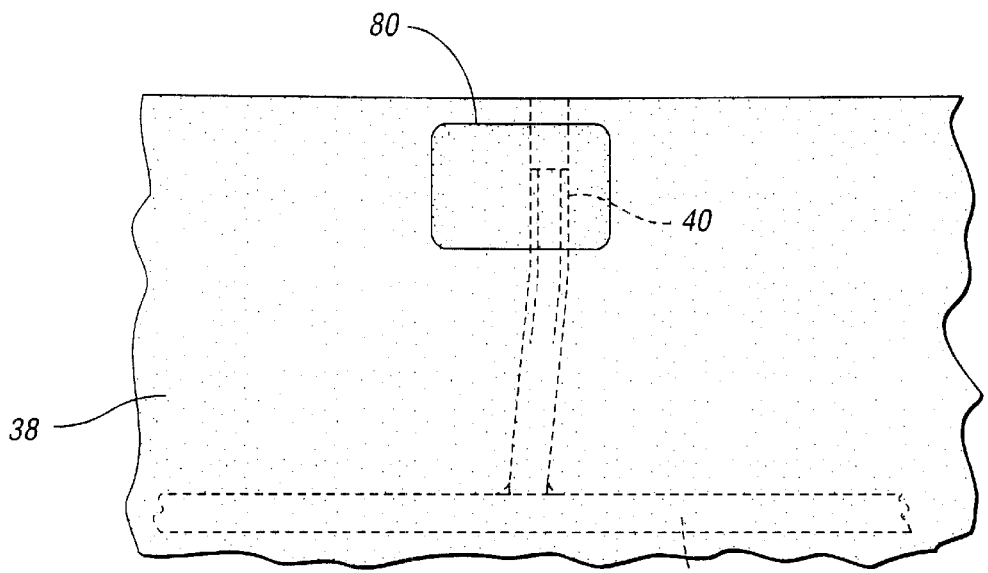
FIG. 3 is a side view of the interior of a portion of the vehicle illustrated in FIG. 2.

As illustrated in FIGS. 3 and 4, to allow the joining of the roof assembly 14 to the cab module 12 to take place, one of the body panels 20 or, as preferably shown, the interior trim components 38 is preferably provided with an openable door, or access panel 80, to allow ingress and egress into opening 78 of the end of the electromagnetic machine 84 that generates the pressure between the sleeve member 56 and connector member 40 of the base frame 16. The door 80 could have a snap-fit closure, or a spring-type hinge 82 to bias the door 80 in the closed position, so that the door remains closed after the joining of the frames 16 and 50 has taken place. Alternatively, a separate door panel 80 could be secured to the interior trim component 38 with pressure sensitive die cut adhesive, such as 3M's VHB™ tape, to close the opening 78 after the joining of the frames 16 and 50 has taken place. It should be readily understood, the vehicle 10 would be provided with doors 80 at each location where the base frame 16 and the roof frame 50 are to be joined. As is the case in the preferred embodiment, a door 80 is provided at locations proximate to the sleeve members 56 and the connector portions 40 of the base frame 16.

Alternatively, panels 20 or portions of the interior trim could be removed to affect the joining of the base frame 16 to the roof frame 50 in place of, or in addition to, providing the doors 80.

The words in the specification are words of description rather than limitation, and it is understood that various changes may be made without departing from the spirit and scope of the invention.

While the best mode for carrying out the invention has been described in detail, those familiar with the art to which this invention relates will recognize various alternative designs and embodiments for practicing the invention as defined by the following claims.

What is claimed is:

1. A method of assembling a vehicle, the method comprising;

providing an open-top cab module comprising a metallic base frame having essentially horizontal members and having a plurality of upwardly extending connector column members, a plurality of exterior body panels attached to the base frame, and interior cab module trim components;

providing a roof assembly comprising a light metallic roof frame, at least one roof panel supported on the roof frame, glass components comprising at least a front windshield supported on the roof frame, and interior roof assembly trim components supported on the roof frame assembly; and securing portions of the roof frame to the upwardly extending connector column members of the cab module frame, wherein the roof assembly includes spaced apart front pillars and spaced apart rear pillars, the front windshield extending between, and being supported by, the front pillars, the front and rear pillars being secured to the upwardly extending connector column members of the cab module frame.

2. The method of claim 1 wherein the roof panel is made of material selected from the group consisting of aluminum and magnesium.

3. The method of claim 2 wherein the base frame is made of steel.

4. The method of claim 2 wherein the base frame is made of light metal.

5. The method of claim 1 wherein the roof assembly is secured to the cab module by a securing means selected from the group consisting of magnetic compression joining and adhesive bonding.

6. The method of claim 1 wherein at least one of the components selected from the group consisting of interior trim components or the body panels is removed from the frame during the securing of the roof top assembly to the cab module.

7. The method of claim 1 wherein at least one vehicle component selected from the group consisting of the body panels and trim components comprises a selectively openable door that is opened during the securing step to facilitate the securing of the roof assembly to the cab module.

8. The method of claim 7 wherein the selectively openable door has a spring-type hinge to bias the door towards the closed position.

9. The method of claim 1 wherein at least one trim component is provided with an opening to allow sufficient access to the base and roof frames to facilitate the securing of the roof assembly to the cab module.

10. The method of claim 9 wherein a closure door is secured to the vehicle component after the roof frame has been secured to the cab module.

11. The method of claim 1 wherein each of the pillars has a downwardly depending member, each downwardly depending member extending from its respective pillar in a plane different from the plane the respective pillar extend in, the downwardly depending members being s cured to the upwardly extending connector column members of the cab module frame.

12. The method of claim 11 wherein each of the downwardly depending members is hollow.

13. The method of claim 12 wherein the method of securing the roof assembly to the cab module comprises placing each of the downwardly depending members over a respective one of the upwardly extending connector column members of the base frame, and using an electromagnetic pulse welding machine placed adjacent each downwardly depending member to generate a pressure that accelerates the downwardly depending member towards the upwardly extending connector column members of the cab module to form a weld between each downwardly depending member and the respective one of the upwardly extending connector column members.

14. The method of claim 13 wherein at least one vehicle component selected from the group consisting of the body panels and trim components comprises a selectively openable door that is opened during the securing step to facilitate the securing of the roof assembly to the cab module.

15. The method of claim 14 wherein the selectively openable door has a spring-type hinge to bias the door in the closed position.

16. The method of claim 1 wherein the cab module comprises passenger doors before the roof assembly is secured to the cab module.

17. The method of claim 1 wherein the roof assembly is precolored prior to securing the roof assembly to the cab module.

18. The method of claim 1 wherein the roof assembly is anodized prior to being secured to the cab module.

19. The method of claim 1 wherein the roof assembly is secured to the cab module at only four locations.

20. The method of claim 1 wherein the essentially horizontal members are hollow.

21. The method of claim 1 wherein the cab module has four upwardly extending connector column members.

22. The method of claim 1 wherein the cab module includes two essentially horizontal members running the length of the car and at least two horizontal members connecting the members running the length of the car.

23. The method of claim 22 wherein each of the upwardly extending column members extend upwardly from an intersection between the members running the length of the car and the members connecting the members running the length of the car.

* * * * *